United States Patent [19]

Shimbori et al.

[11] Patent Number: 4,579,389
[45] Date of Patent: Apr. 1, 1986

[54] VEHICLE SEAT

[75] Inventors: Hideo Shimbori, Akishima; Toshio Furukawa, Tokyo, both of Japan

[73] Assignee: Tachikawa Spring Co. Ltd., Tokyo, Japan

[21] Appl. No.: 605,285

[22] Filed: Apr. 30, 1984

[51] Int. Cl.⁴ ............................................... A47C 7/18
[52] U.S. Cl. ............................ 297/452; 297/DIG. 1; 5/474
[58] Field of Search ......... 297/452, 458, 459, DIG. 1; 5/481, 474

[56] References Cited

U.S. PATENT DOCUMENTS

| | | | |
|---|---|---|---|
| 3,088,133 | 5/1963 | Waxman | 297/DIG. 1 |
| 3,161,436 | 12/1964 | Hood | 297/DIG. 1 |
| 3,266,065 | 8/1966 | Bereday | 297/DIG. 1 |
| 3,616,171 | 10/1971 | Hoskinson, Sr. | 5/481 X |
| 3,679,263 | 7/1972 | Cadiou | 297/DIG. 1 X |
| 3,727,980 | 4/1973 | Tischler | 297/458 X |
| 3,742,528 | 7/1973 | Münch | 5/481 X |
| 3,833,259 | 9/1974 | Pershing | 5/481 X |
| 3,961,823 | 6/1976 | Caudill, Jr. | 297/DIG. 1 X |
| 4,057,292 | 11/1977 | Arnold | 297/DIG. 1 X |

Primary Examiner—William E. Lyddane
Assistant Examiner—José V. Chen
Attorney, Agent, or Firm—Cushman, Darby and Cushman

[57] ABSTRACT

A vehicle seat is disclosed which is provided on its surface with a plurality of intersecting, recessed grooves for decoration. The seat includes a cushion member formed of a foam material and provided on its surface with a plurality of intersecting, recessed grooves. Projections are provided adjacent to the intersections of these recessed grooves, respectively. Such projections can prevent wrinkles from being produced in the intersections of the decorative recessed grooves formed in a top member which is a component of the seat. Specifically, when such top member placed over the cushion member is hung in along the recessed grooves of the cushion member, the recessed grooves for decoration are formed on the surface of the top member. During this hang-in operation, the projections are compressed so that repelling resilient forces are produced in these projections. Such resilient forces of the projections prevent any wrinkles from occurring in the intersections of the decorative recessed grooves in the top member.

7 Claims, 12 Drawing Figures

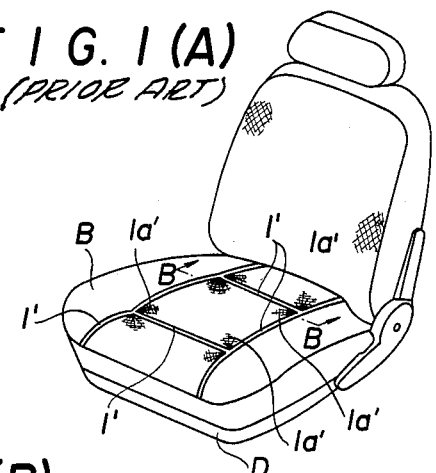
FIG. 1(A)
(PRIOR ART)
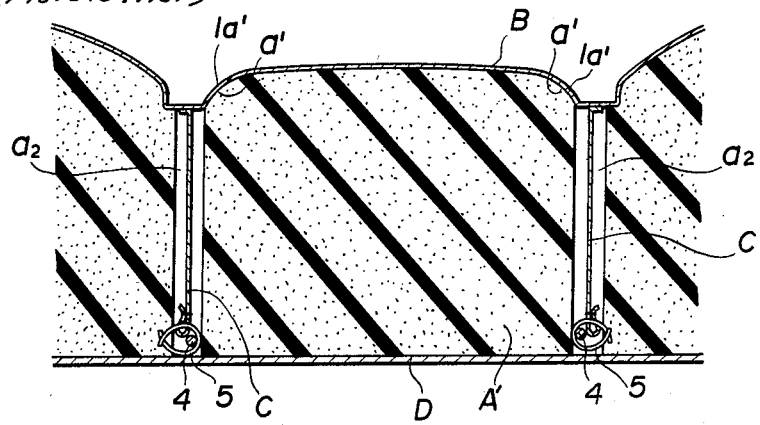
FIG. 1(B)
(PRIOR ART)
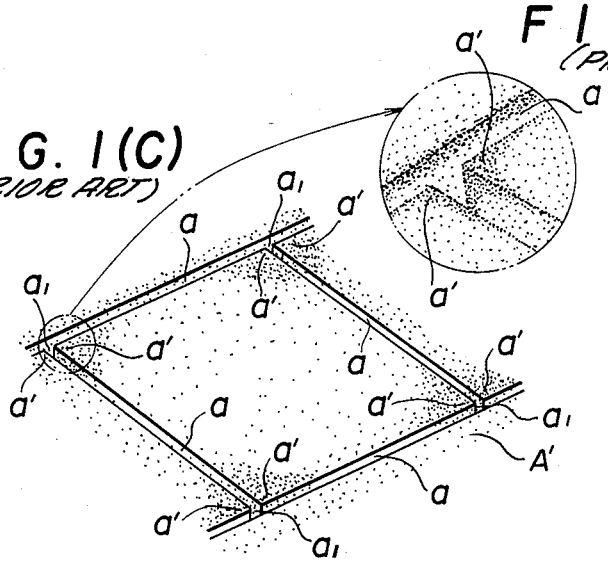
FIG. 1(C)
(PRIOR ART)
FIG. 1(D)
(PRIOR ART)

VEHICLE SEAT

BACKGROUND OF THE INVENTION

1. Field of the Invention

The present invention relates to a vehicle seat and, more particularly, to an improved vehicle seat which is provided on its top surface with a plurality of intersecting, recessed grooves for decoration so as to enhance the aesthetic appearance of the same seat.

2. Description of the Prior Art

FIG. 1(A) illustrates a conventional vehicle seat of this type which is formed on its top surface with a plurality of intersecting, recessed grooves (1') (1') --- . It has been found, however, that such construction gives rise to wrinkles (1a')(1a') --- adjacent to the intersections of these recessed grooves (1')(1') --- which impair the aesthetic appearance of the prior art vehicle seat. Such prior art seat is formed on its top surface with recessed grooves (a)(a) --- in such a manner as shown in FIGS. 1(C) and (D), and also comprises a cushion member (A') of a foam marterial having insertion bores (a2)(a2) --- at the intersections (a1)(a1) --- of the recessed grooves (a)(a) --- and a top member (B) placed over the surface of the cushion member (A') and having a pulling member (C) or a cloth of string secured to the rear surface of the same cushion member. The top member (B) is mounted to the cushion member (A'), as shown in FIG. 1(B), by inserting the pulling members (C) into the insertion bores (a2)(a2) --- of the cushion member (A') respectively and then fixing the respective tip ends of the pulling members (C) via respective hog rings (5) to respective hanging wires (4) embedded adjacent to the bottom portion of the cushion member (A). Thus, the top member (B) is structured such that it can be pulled inwardly along the recessed grooves (a)(a) --- formed on the surface of the cushion member (A'). In this pulling operation, portions (a')(a') --- located adjacent to the intersections (a1)(a1) --- of the recessed grooves (a)(a) --- in the cushion member (A') are compressed since the top member (B) is strongly pulled in by the pulling member (C). The compression of these adjacent portions (a')(a') --- causes the above-mentioned wrinkles (1a')(1a') --- to occur at such locations of the top member (B) as correspond to the same portions (a')(a') ---.

No wrinkles will be produced in the other portions of the top member (B) because the ends of the other portions of the top member (B) are pulled onto the bottom of the seat or because the peripheries of the surface of the cushion member (A') are formed in a rigid manner.

In the drawings, reference character (D) designates a saucer-type frame on which the above-mentioned cushion member (A') is fixedly placed.

SUMMARY OF THE INVENTION

Under these circumstances, the present invention aims at eliminating the drawbacks in the above-mentioned prior art vehicle seat.

Accordingly, it is the primary object of this invention to provide an improved vehicle seat including a plurality of decorative recessed grooves on its top surface which prevents any wrinkles from occurring adjacent to the intersections of these recessed grooves.

In accomplishing this object, according to the invention, projections are provided respectively adjacent to the intersections of the recessed grooves formed in the cushion member of the present seat. Thus, in spite of the fact that when a top member is placed over the cushion member and is then pulled in by a pulling member and that those portions adjacent to the intersections of the recessed grooves in the cushion member are compressed due to the pulling action of such pulling member, resilient repelling forces of such compressed projections will be produced to prevent any wrinkles from being formed in the top member as is the case in the conventional vehicle seat.

Such projections provided adjacent to respective intersections of the recessed grooves in the cushion member are mold-formed integrally with the cushion member, and, although they may be shaped in any form, for example, in a cubic or cylindrical form, they must be so formed as to project above the surface of the cushion member.

The top member employed in the present invention is formed of the same material as that of the above-mentioned prior art vehicle seat, but it has the above mentioned pulling members respectively secured to the portions of its back surface that correspond respectively to the positions of insertion bores formed in the cushion member. Also, this top member may comprise a single top layer, or may comprise a lamination of a top layer, a foam wadding and a wadding cover.

Other objects and advantages of the invention will become apparent from the following description of a preferred embodiment with reference to the accompanying drawings.

BRIEF DESCRIPTION OF THE DRAWINGS

FIG. 1(A) is a perspective view of a conventional vehicle seat;

FIG. 1(B) is a sectional view taken along line B—B in FIG. 1(A);

FIG. 1(C) is a perspective view of a surface of a cushion member employed in the conventional seat shown in FIG. 1(A);

FIG. 1(D) is a partially enlarged view of the surface shown in FIG. 1(C);

FIGS. 6(A), (B) and (C) are respectively perspective views illustrating different embodiments of projections provided in the cushion member of the invention; and, FIG. 7 is a sectional view illustrating a state in which the top member of the invention is placed onto the cushion member and is then hung in.

DETAILED DESCRIPTION OF A PREFERRED EMBODIMENT OF THE PRESENT INVENTION

Figure 2:
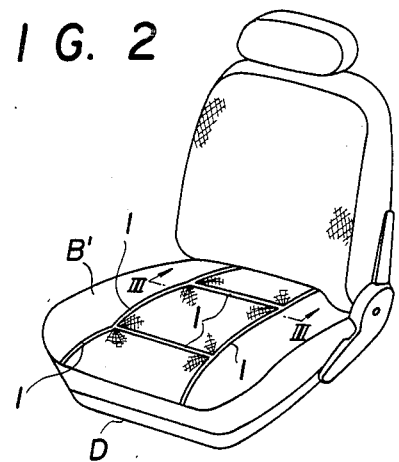
FIG. 2 is a perspective view of a vehicle seat constructed in accordance with the present invention.

In FIG. 2, a vehicle seat constructed in accordance with the present invention is illustrated which is formed on its top surface with a plurality of intersecting, decorative recessed grooves (1)(1) ---, with no wrinkles being generated in such portions of its top member (B') as located adjacent to the intersections of these recessed grooves (1)(1) ---, in the above-mentioned prior art vehicle seat, as described before, the wrinkles (1a')(1a') --- are produced in similar portions of its top member (B).

Figure 3:
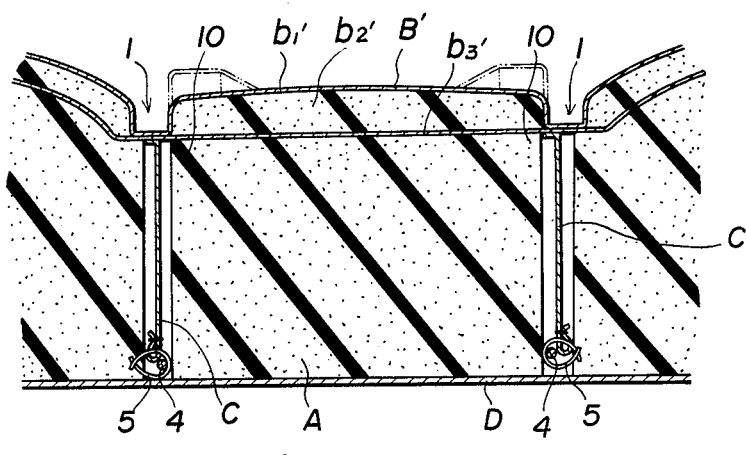
FIG. 3 is a sectional view taken along line III—III shown in FIG. 2.

FIG. 3 illustrates a section view of the seat of the invention taken along line III—III in FIG. 2. In the illustrated embodiment, none of such wrinkles (1a')(1a') --- are formed in the top member (B') in spite of the fact that the top member (B') is also adapted to be pulled inwardly by a pulling member (C) fixed to a base wire (4) which is embedded adjacent to the bottom portion (D) of a cushion member (A) forming a part of the present seast, as is similar in the above-mentioned prior art vehicle seat.

As can be seen in FIG. 3, top member (B') comprises a combination or lamination of three layer members, i.e., a top layer (b1'), a wadding (b2') made of a foam material, and a wadding cover (b3') made of a cloth. A high-frequency welding machine is used to pressurize and weld these three layer members (b1'), (b2') and (b3') together into a unit. Specifically, such welding may be performed such that the welded portions respectively extend in an intersecting manner so as to correspond to respective recessed grooves (a)(a) --- formed in the cushion member (A) as well as are substantially equal in width to the recessed grooves (a)(a) --- in the cushion member (A).

Accordingly, while the top member (B') is formed by means of such pressurized welding, the foam wadding (b2') is collapsed. As a result of this, on the surface of the top member (B') there are provided recessed grooves which are identical in configuration with the recessed grooves (a)(a) --- formed in the surface of the cushion member (A).

Figure 4:
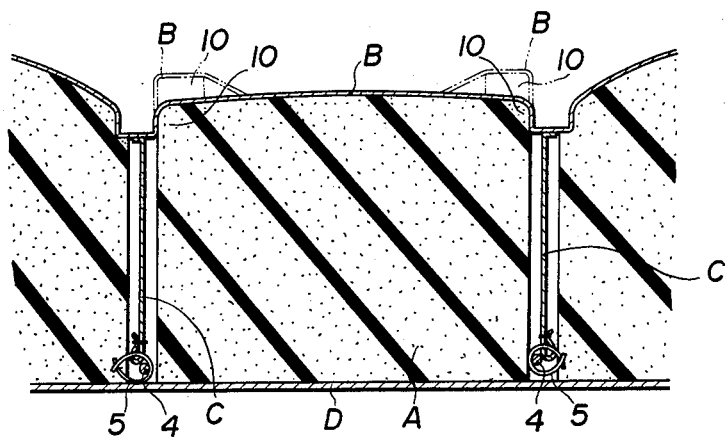
FIG. 4 is a sectional view of the seat of the invention in which a top member comprising a single top layer is employed.

FIG. 4 illustrates another embodiment of the top member, or a top member (B) formed of a single cloth.

Both of the two top members (B) and (B'), as in the above-mentioned conventional vehicle seat, are adapted to be pulled by respective pulling members (C)(C) --- each of which is fixed by a hog ring (5) to the base wire (4) of the cushion member (A).

Figure 5:
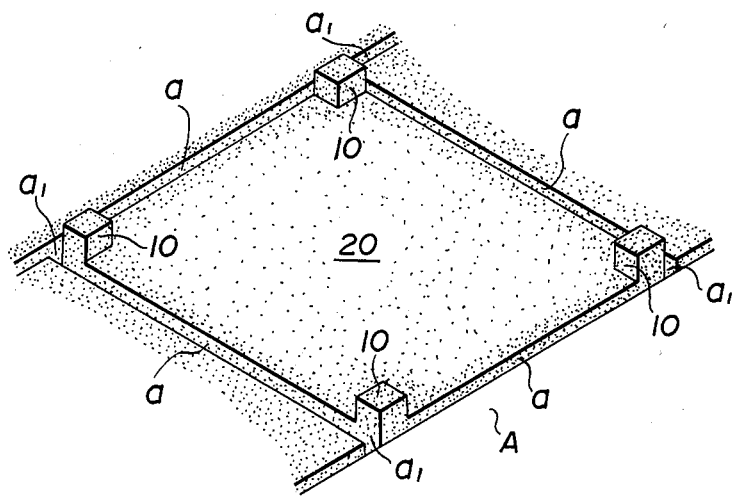
FIG. 5 is a perspective view of a surface of a cushion member employed in the seat of the invention.

Both cushion members (A) respectively shown in FIGS. 3 and 4 are the same one which, as shown in FIG. 5, is formed on its surface with a plurality of recessed grooves (a)(a) --- and also which is provided with a plurality of projections (10)(10) --- respectively projecting at and from portions adjacent to the intersections (a1)(a1) --- of such recessed grooves (a)(a) ---.

Figures 6A, 6B, 6C:
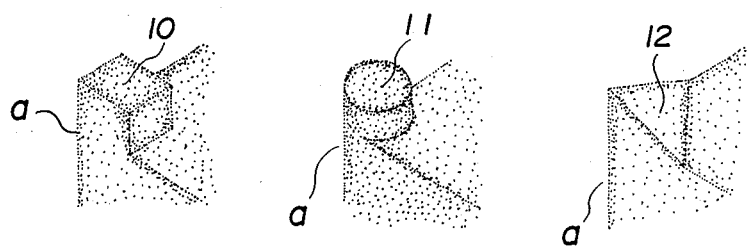

In the illustrated embodiment, such projections (10) (10) --- are located at the corners of a portion (20) surrounded by the recessed grooves (a)(a) --- i.e., the areas where wrinkles are mostly produced. These projections (10)(10) --- may be shaped in any form, for example, in a cubic-(10), cylindrical- (11), or pyramidal form (12), as shown in FIGS. 6(A), (B) and (C). Also, they are preferably 10 mm or so high. Although not shown, the entire portion (20) adjacent to the recessed portion (a)(a) --- may be raised so as to provide a projection, if necessary.

Figure 7:
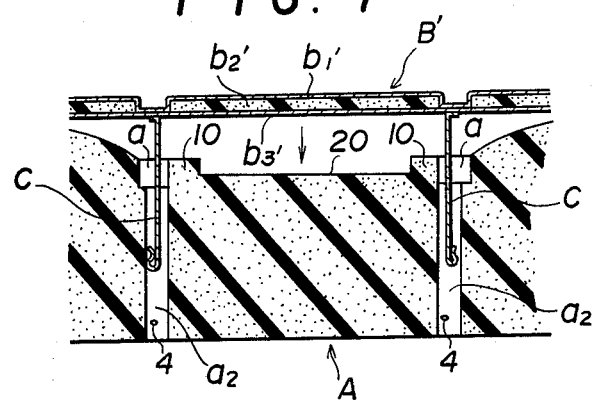

FIG. 7 illustrates one manner in which the top member (B') is placed onto the cushion member (A) and is then hung in.

Specifically, the top member (B') is placed onto the cushion member (A) and is then pulled inwardly by the pulling members (C)(C) by inserting the pulling members (C)(C) into respective insertion bores (a2) formed in the intersections of the recessed grooves (a)(a) of the cushion member (A) and then fixing the lower ends of the pulling members (C)(C) by respective hog rings (5) to the hose wires (4) embedded within the bottom portion of the cushion member (A). During such pulling operation, the projections (10) are compressed so as to be substantially level with the portion (20) which is surrounded by the recessed grooves (a)(a) ---, generating resilient forces in the projections (10). Therefore, these resilient forces of the projections (10) tension the portions of the top member (B') that correspond to such projections (10) so as to prevent wrinkles from occurring on the surface of the top member (B').

What is claimed is:

1. A vehicle seat comprising:
   a cushion member for supporting a seat occupant and including a plurality of intersecting recessed grooves to thereby establish a peripheral boundary of at least one discrete surface region of said cushion member;
   a cover member for covering said cushion member; and
   pulling means for exerting pulling forces upon said cover member to cause portions of said cover member to be accepted within said recessed grooves so that said accepted cover member portions form decorative boundaries around said at least one surface region of said cushion member;
   said cushion member also including wrinkle-preventing means for exerting tensioning forces upon said cover member to thereby tension portions of said cover member to prevent wrinkles from forming therein, said wrinkle-preventing means including plural projection members formed integrally with said cushion member and positioned within said at least one surface region adjacent to intersections of said recessed grooves, each said projection member projecting outwardly above said at least one surface region, wherein said pulling means causes said cover member to resiliently compress each said projection member to thereby, in turn, cause each said projection member to exert said tensioning forces upon said cover member whereby wrinkles are prevented.

2. The vehicle seat as in claim 1 wherein said projection members are at least one geometric form selected from the group consisting of cubic-, cylindrical-, and pyramidal-forms.

3. The vehicle seat as in claim 1 wherein said cushion member includes a bottom support, and wherein said pulling means includes a flexible pulling member having one end fixed to said cover member, and coupling means for coupling another end of said pulling member adjacent to said bottom support.

4. The vehicle seat as in claim 3 wherein said coupling means includes a base wire embedded within said cushion member and a hog ring coupling said another end to said base wire.

5. The vehicle seat as in claim 1 wherein said cover member includes a top layer, a wadding cover layer, and wadding material disposed between said top layer and said wadding cover layer.

6. The vehicle seat as in claim 5 wherein said cover member, wadding material, and wadding cover layer are joined to one another at seams which are in registry with said recessed grooves.

7. The vehicle seat as in claim 1, wherein said cushion member further includes insertion bores formed in registry with said intersections of said recessed grooves, and wherein said pulling means is fixed to the back surface of said top member and inserted into said insertion bores, and wherein said pulling means includes a tip end portion and a base wire embedded within said cushion member, said tip end portion being fixed to said base wire.

* * * * *